United States Patent
Hall

(10) Patent No.: US 6,705,468 B1
(45) Date of Patent: Mar. 16, 2004

(54) ORGANIZER ASSEMBLY

(76) Inventor: Antonia R. Hall, 10 Quail Run, Silver City, NM (US) 88061

( * ) Notice: Subject to any disclaimer, the term of this patent is extended or adjusted under 35 U.S.C. 154(b) by 106 days.

(21) Appl. No.: 10/071,447

(22) Filed: Feb. 8, 2002

(51) Int. Cl.[7] .................. B65D 21/00; B65D 25/28
(52) U.S. Cl. .................. 206/581; 119/600; 206/223; 206/372; 211/70.6; 220/23.88; 220/735; 220/771
(58) Field of Search .............. 119/600; 206/223, 206/225, 226, 229, 372, 373, 581; 211/62, 163, 70.6; 220/23.83, 23.87, 23.88, 23.89, 735, 752, 771

(56) References Cited

U.S. PATENT DOCUMENTS

| | | | |
|---|---|---|---|
| 2,464,085 A | | 3/1949 | Hess |
| 2,743,836 A | * | 5/1956 | Roberts .................. 217/19 |
| 3,526,334 A | * | 9/1970 | Ashton et al. ............ 220/23.83 |
| 3,842,976 A | * | 10/1974 | Dea .................. 206/203 |
| 4,887,713 A | * | 12/1989 | Tupper .................. 206/225 |
| 5,035,321 A | * | 7/1991 | Denton .................. 206/225 |
| 5,134,974 A | | 8/1992 | Houser |
| 5,207,321 A | * | 5/1993 | Jones .................. 206/223 |
| 5,386,922 A | * | 2/1995 | Jordan .................. 220/23.83 |
| 5,423,445 A | * | 6/1995 | Montanari et al. ....... 220/23.83 |
| 5,551,569 A | | 9/1996 | Garvin-Mazzarisi |
| 5,680,932 A | * | 10/1997 | Dickinson et al. .......... 206/372 |
| D399,379 S | | 10/1998 | Joseph |
| 5,855,186 A | | 1/1999 | Larsen et al. |
| 5,921,596 A | | 7/1999 | Sheriff et al. |

* cited by examiner

Primary Examiner—Jim Foster

(57) ABSTRACT

A organizer assembly for providing a user with a convenient organizer for cat grooming and litter box supplies. The organizer assembly includes a base that has a bottom surface, a top surface and a peripheral edge that extends between the top and bottom surfaces. A peripheral wall is attached to and extends upwardly from the top surface. A handle is attached to the base. A pair of containers, each has a bottom wall and perimeter wall attached to and extending upwardly from the bottom wall, each of the containers is positionable in the base.

19 Claims, 3 Drawing Sheets

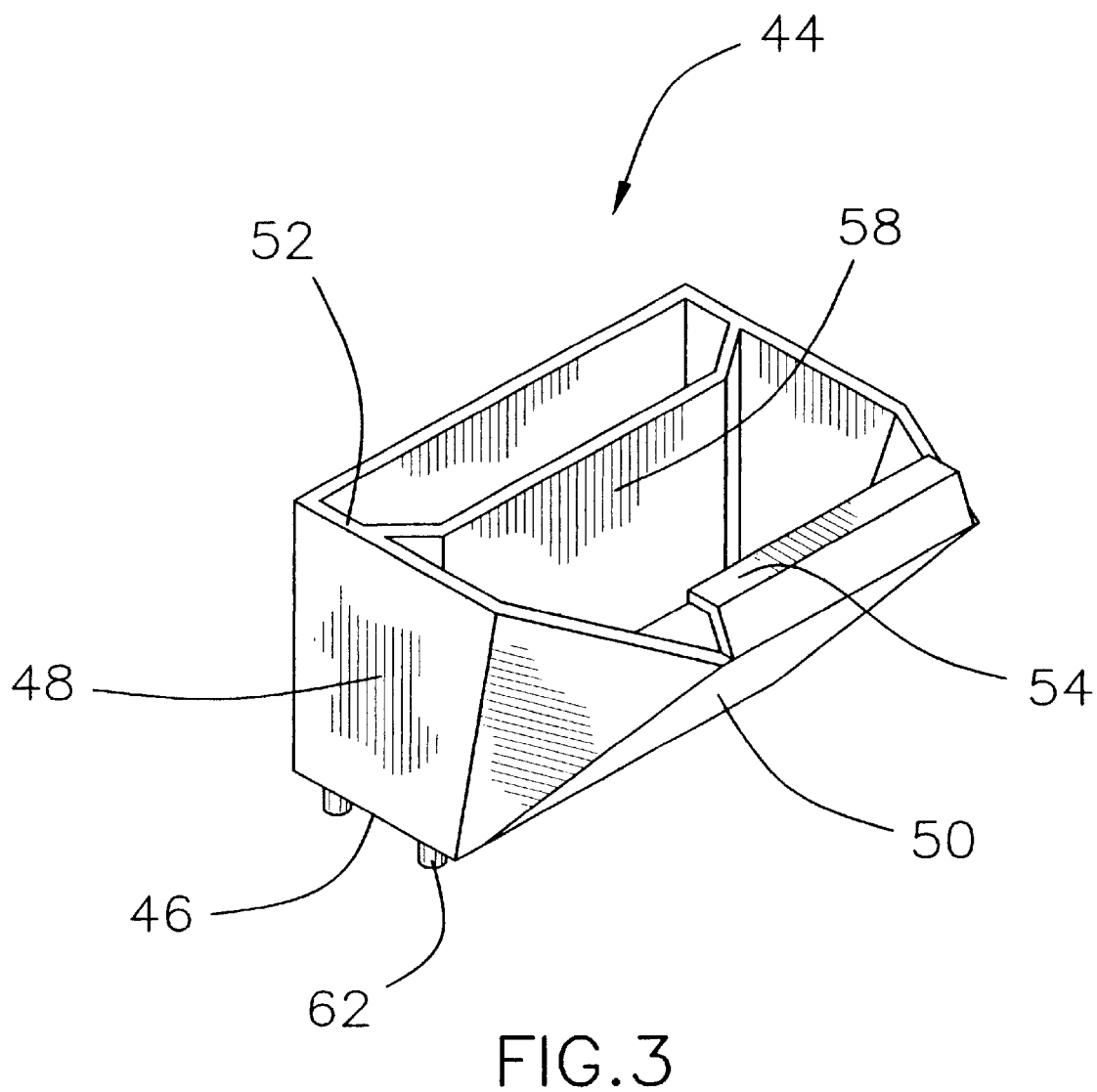

ORGANIZER ASSEMBLY

BACKGROUND OF THE INVENTION

1. Field of the Invention

The present invention relates to caddy devices and more particularly pertains to a new organizer assembly for providing a user with a convenient organizer for cat grooming and litter box supplies.

2. Description of the Prior Art

The use of caddy devices is known in the prior art. U.S. Pat. No. 5,855,186 describes a sanitization system for cat litter boxes. Another type of caddy device is U.S. Pat. No. 5,551,569 describing a bag dispenser and temporary pet waste receptacle.

While these devices fulfill their respective, particular objectives and requirements, the need remains for a device that would serve to effectively organize cat supplies, making them easy to access when needed.

SUMMARY OF THE INVENTION

The present invention meets the needs presented above by providing different sizes of organizers and various storage means to effectively organize various different utensils and supplies.

Still yet another object of the present invention is to provide a new organizer assembly that would be easy to use, lightweight, relatively inexpensive, and portable.

Even still another object of the present invention is to provide a new organizer assembly that would prevent the messy appearance of disorganized cat supplies from detracting from room decor.

To this end, the present invention generally comprises a base that has a bottom surface, a top surface and a peripheral edge that extends between the top and bottom surfaces. A peripheral wall is attached to and extends upwardly from the top surface. A handle is attached to the base. A pair of containers, each has a bottom wall and perimeter wall attached to and extending upwardly from the bottom wall, each of the containers is positionable in the base.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the present invention.

DESCRIPTION OF THE PREFERRED EMBODIMENT

Figure 1:
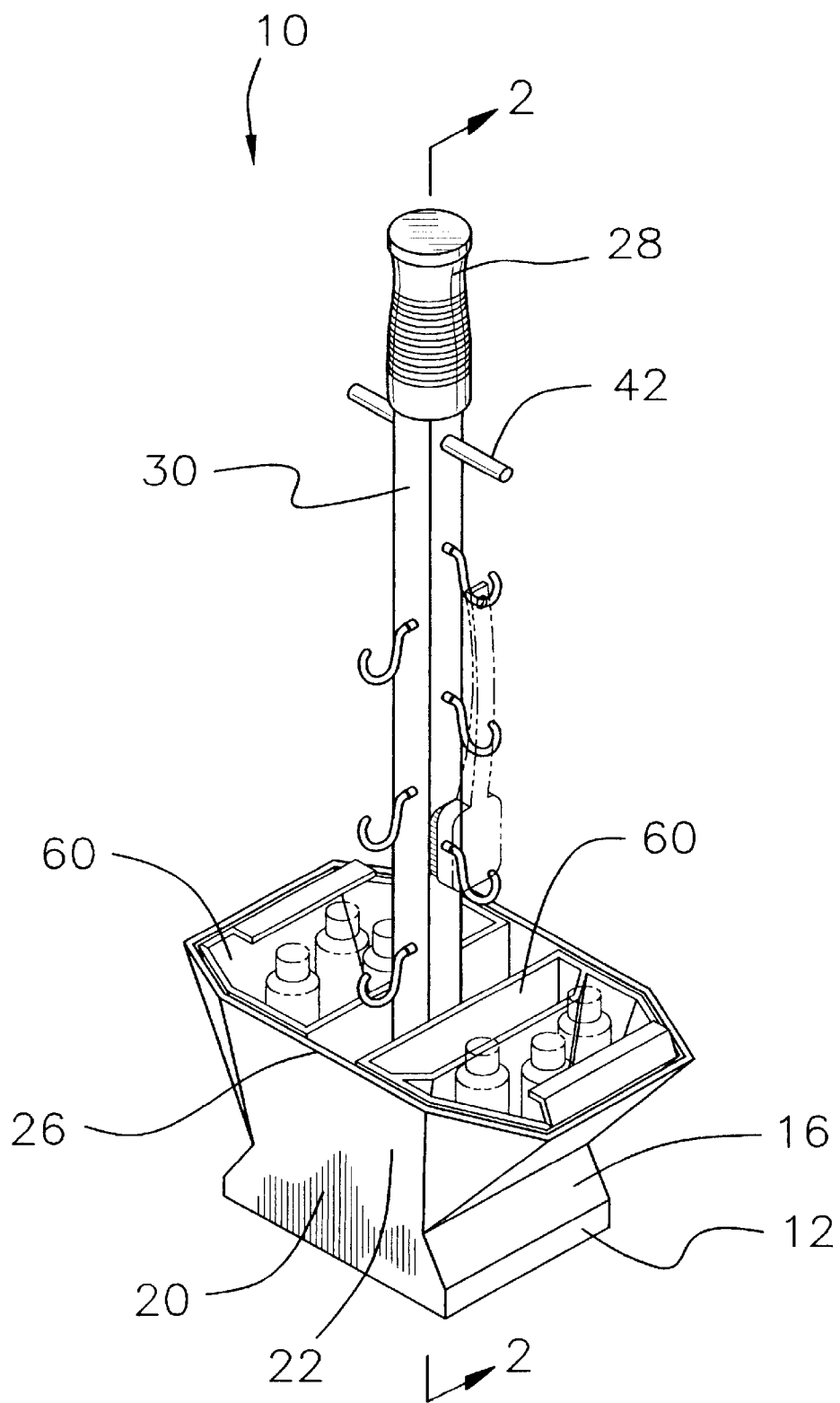
FIG. 1 is a perspective view of a new organizer assembly according to the present invention.
Figure 2:
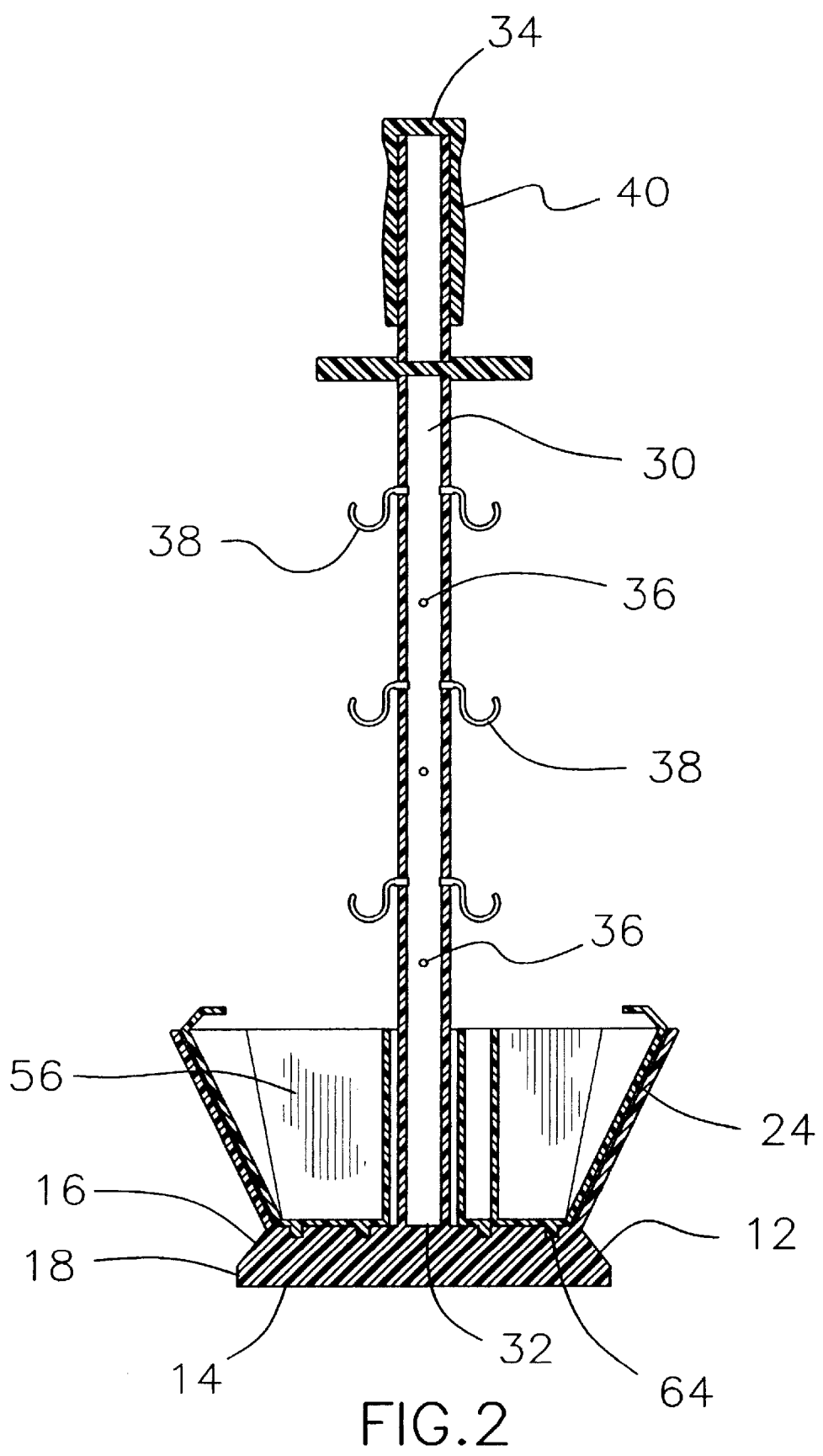
FIG. 2 is a cross-sectional view of the present invention.

With reference now to the drawings, and in particular to FIGS. 1 through 3 thereof, a new organizer assembly embodying the principles and concepts of the present invention and generally designated by the reference numeral 10 will be described.

As best illustrated in FIGS. 1 through 3, the organizer assembly 10 generally comprises a base 12 that has a bottom surface 14, a top surface 16 and a peripheral edge 18 that extend between the top 16 and bottom 14 surfaces. A peripheral wall 20 is attached to and extends upwardly from the top surface 16. The peripheral wall 20 includes a pair of side walls 22 and a pair of end walls 24. Each of the side walls 22 is generally vertical. Each of the end walls 24 angles outward from each other from the base 12 to an upper edge 26 of the peripheral walls 20.

A handle 28 is attached to the base 12, the handle 28 includes an elongate member 30 that has a first end 32 and a second end 34. The first end 32 is attached to the top surface 16 of the base 12 and is generally centrally located in the base 12. The handle 28 has a plurality of apertures 36 that extend therein and are spaced from each other. The apertures 36 are positioned generally between the first 32 and second 34 ends. A plurality of hook members 38, each is selectively extendable into one of the apertures 36 for releasably coupling the hook members 38 to the handle 28. A grip 40 is attached to the second end 34 of the handle 28. A rod 42 is attached to and extends through the handle 28, the rod 42 is positioned nearer the second end 34 than the first end 32.

A pair of containers 44, each has a bottom wall 46 and perimeter wall 48 attached to and extending upwardly from the bottom wall 46. Each of the containers 44 is positionable in the base 12 on opposite sides of the handle 28 such that each of the containers 44 is abutting one of the end walls 24. Each of the containers 44 has a shape contoured to an abutting end and side walls such that a wall abutting the end walls defines an outer wall 50. Each of the outer walls 50 has an upper edge 52 that has a lip 54 thereon. The lips 54 extend upwardly and inwardly with respect to an associated container 44. A first of the containers 56 has an intermediate wall 58 therein that extends upwardly from the bottom wall 46 such that the first of the containers 56 is divided into a pair of compartments 60. A plurality of legs 62 is attached to each of the bottom walls 46 of the containers 44. Each of the legs 62 is removably extendable into one of a plurality of corresponding bores 64 in the top surface 16 of the base 12.

In use, the present invention would sit on a support surface and house all of the necessary items needed to change the litter box and groom the animal.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A caddy device for holding pet supplies for a cat, said device comprising:

a base having a bottom surface, a top surface and a peripheral edge extending between said top and bottom surfaces, a peripheral wall being attached to and extending upwardly from said top surface;

a handle being attached to said base;

a pair of containers, each of said containers having a bottom wall and perimeter wall attached to and extending upwardly from said bottom wall, each of said containers being positionable in said base; and a plurality of legs being attached to each of said bottom walls of said containers, each of said legs being removably extendable into one of a plurality of corresponding bores in said top surface of said base.

2. The caddy device as in claim 1, wherein said peripheral wall includes a pair of side walls and a pair of end walls, each of said side walls being generally vertical, each of said end walls angling outward from each other from said base to an upper edge of said peripheral walls.

3. The caddy device as in claim 1, wherein said handle includes an elongate member having a first end and a second end, said first end being attached to said top surface of said base and being generally centrally located in said base.

4. The caddy device as in claim 3, wherein said handle has a plurality of apertures extending therein and spaced from each other, said apertures being positioned generally between said first and second ends.

5. The caddy device as in claim 4, further including a plurality of hook members, each of said hook members being selectively extendable into one of said apertures for releasably coupling the hook members to the handle.

6. The caddy device as in claim 3, further including a grip being attached to said second end of said handle.

7. The caddy device as in claim 3, further including a rod being attached to and extending through said handle, said rod being positioned nearer said second end than said first end.

8. The caddy device as in claim 2, wherein each of said containers being positionable in said base such that each of said containers is abutting one of said end walls, each of said containers having a shape contoured to an abutting end and side walls such that a wall abutting said end walls defines an outer wall.

9. The caddy device as in claim 8, each of said outer walls having an upper edge having a lip thereon, said lips extending upwardly and inwardly with respect to an associated container.

10. The caddy device as in claim 9, wherein a first of said containers has an intermediate wall therein extending upwardly from said bottom wall such that the first of said containers is divided into a pair of compartments.

11. The caddy device as in claim 1, wherein a first of said containers has an intermediate wall therein extending upwardly from said bottom wall such that the first of said containers is divided into a pair of compartments.

12. The caddy device as in claim 8, further including a plurality of legs being attached to each of said bottom walls of said containers, each of said legs being removably extendable into one of a plurality of corresponding bores in said top surface of said base.

13. The caddy device as in claim 1, further comprising:

said peripheral wall including a pair of side walls and a pair of end walls, each of said side walls being generally vertical, each of said end walls angling outward from each other from said base to an upper edge of said peripheral walls;

said handle including an elongate member having a first end and a second end, said first end being attached to said top surface of said base and being generally centrally located in said base, said handle having a plurality of apertures extending therein and spaced from each other, said apertures being positioned generally between said first and second ends;

a plurality of hook members, each of said hook members being selectively extendable into one of said apertures for releasably coupling the hook members to the handle;

a grip being attached to said second end of said handle;

a rod being attached to and extending through said handle, said rod being positioned nearer said second end than said first end;

each of said containers being positionable in said base on opposite sides of said handle such that each of said containers is abutting one of said end walls, each of said containers having a shape contoured to an abutting end and side walls such that a wall abutting said end walls defines an outer wall, each of said outer walls having an upper edge having a lip thereon, said lips extending upwardly and inwardly with respect to an associated container, a first of said containers having an intermediate wall therein extending upwardly from said bottom wall such that the first of said containers is divided into a pair of compartments.

14. A caddy device for holding pet supplies for a cat, said device comprising:

a base having a bottom surface, a top surface and a peripheral edge extending between said top and bottom surfaces, a peripheral wall being attached to and extending upwardly from said top surface;

a handle being attached to said base;

a pair of containers, each of said containers having a bottom wall and perimeter wall attached to and extending upwardly from said bottom wall, each of said containers being positionable in said base;

wherein said peripheral wall includes a pair of side walls and a pair of end walls, each of said side walls being generally vertical, each of said end walls angling outward from each other from said base to an upper edge of said peripheral walls;

wherein each of said containers being positionable in said base such that each of said containers is abutting one of said end walls, each of said containers having a shape contoured to an abutting end and side walls such that a wall abutting said end walls defines an outer wall; and each of said outer walls having an upper edge having a lip thereon, said lips extending upwardly and inwardly with respect to an associated container.

15. The caddy device as in claim 14, wherein a first of said containers has an intermediate wall therein extending upwardly from said bottom wall such that the first of said containers is divided into a pair of compartments.

16. A caddy device for holding pet supplies for a cat, said device comprising:

a base having a bottom surface, a top surface and a peripheral edge extending between said top and bottom surfaces, a peripheral wall being attached to and extending upwardly from said top surface;

a handle being attached to said base;

a pair of containers, each of said containers having a bottom wall and perimeter wall attached to and extending upwardly from said bottom wall, each of said containers being positionable in said base;

wherein said peripheral wall includes a pair of side walls and a pair of end walls, each of said side walls being generally vertical, each of said end walls angling outward from each other from said base to an upper edge of said peripheral walls;

wherein each of said containers being positionable in said base such that each of said containers is abutting one of said end walls, each of said containers having a shape contoured to an abutting end and side walls such that a wall abutting said end walls defines an outer wall; and a plurality of legs being attached to each of said bottom walls of said containers, each of said legs being removably extendable into one of a plurality of corresponding bores in said top surface of said base.

17. A caddy device for holding pet supplies for a cat, said device comprising:

a base having a bottom surface, a top surface and a peripheral edge extending between said top and bottom surfaces, a peripheral wall being attached to and extending upwardly from said top surface;

a handle being attached to said base;

a pair of containers, each of said containers having a bottom wall and perimeter wall attached to and extending upwardly from said bottom wall, each of said containers being positionable in said base;

wherein said handle includes an elongate member having a first end and a second end, said first end being attached to said top surface of said base and being generally centrally located in said base; and wherein said handle has a plurality of apertures extending therein and spaced from each other, said apertures being positioned generally between said first and second ends.

18. The caddy device as in claim 17, further including a plurality of hook members, each of said hook members being selectively extendable into one of said apertures for releasably coupling the hook members to the handle.

19. A caddy device for holding pet supplies for a cat, said device comprising:

a base having a bottom surface, a top surface and a peripheral edge extending between said top and bottom surfaces, a peripheral wall being attached to and extending upwardly from said top surface;

a handle being attached to said base;

a pair of containers, each of said containers having a bottom wall and perimeter wall attached to and extending upwardly from said bottom wall, each of said containers being positionable in said base;

wherein said handle includes an elongate member having a first end and a second end, said first end being attached to said top surface of said base and being generally centrally located in said base; and further including a rod being attached to and extending through said handle, said rod being positioned nearer said second end than said first end.

* * * * *